No. 779,785. PATENTED JAN. 10, 1905.
O. JUNGGREN.
PACKING FOR ELASTIC FLUID TURBINES.
APPLICATION FILED DEC. 24, 1903.
2 SHEETS—SHEET 1.
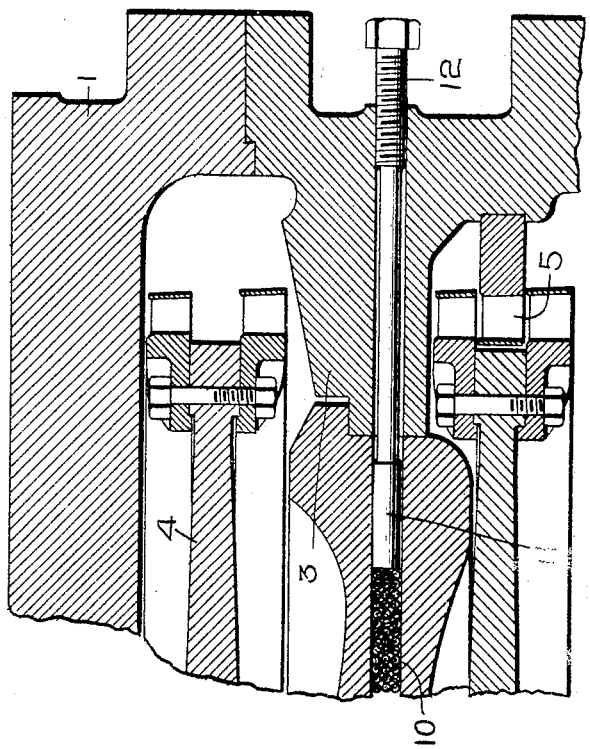
Fig. 1.
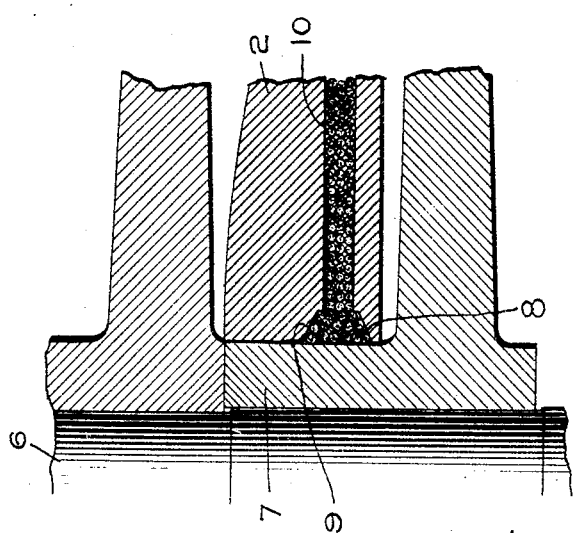
Witnesses:
Marcus L. Byng.
Alex. F. MacDonald.
Inventor:
Oscar Junggren,
by Albert G. Davis
Att'y.

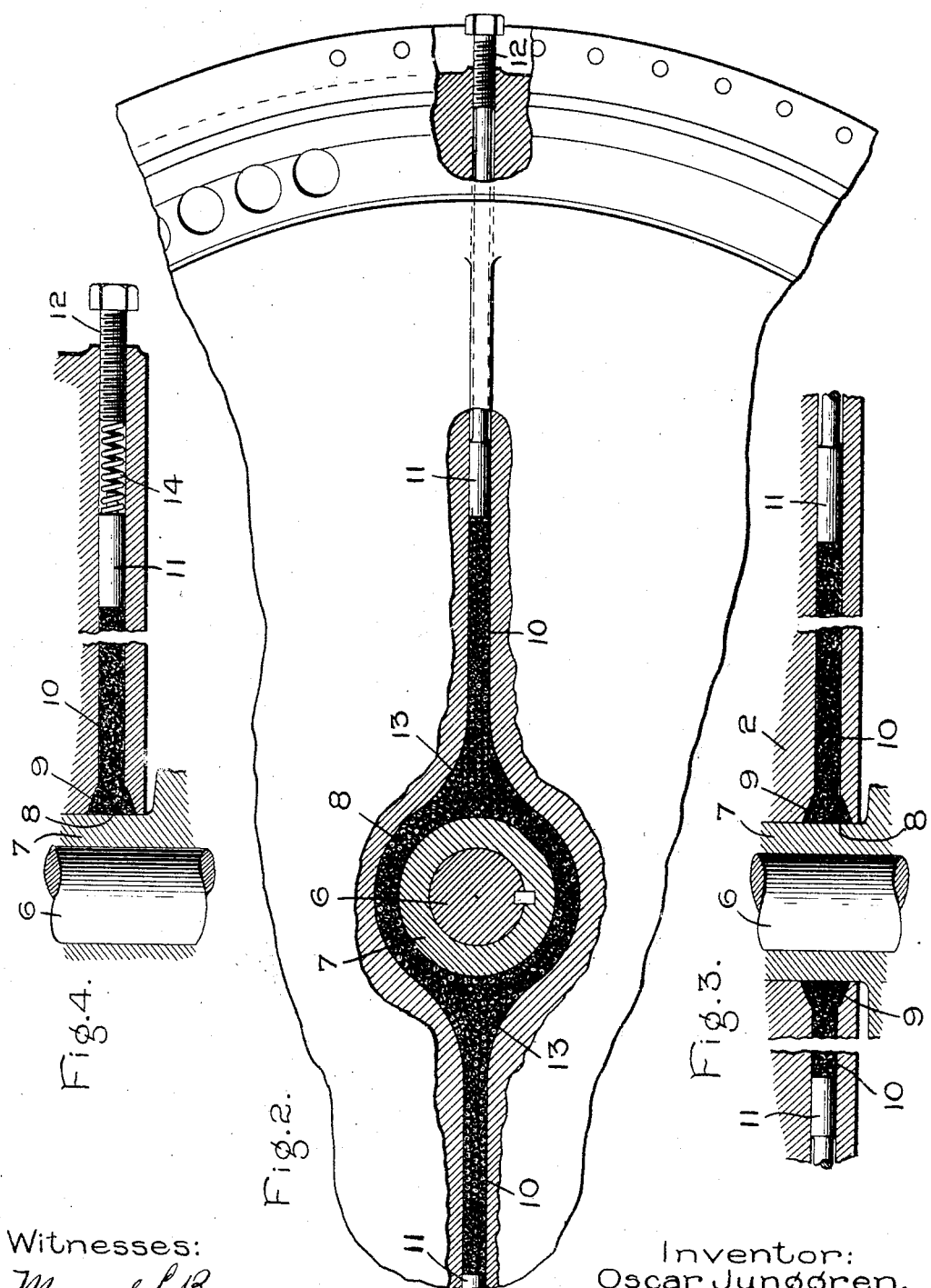

No. 779,785.

Patented January 10, 1905.

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

PACKING FOR ELASTIC-FLUID TURBINES.

SPECIFICATION forming part of Letters Patent No. 779,785, dated January 10, 1905.

Application filed December 24, 1903. Serial No. 186,480.

*To all whom it may concern:*

Be it known that I, OSCAR JUNGGREN, a citizen of the United States, residing at Schenectady, in the county of Schenectady, State of New York, have invented certain new and useful Improvements in Packings for Elastic-Fluid Turbines, of which the following is a specification.

Elastic-fluid turbines as ordinarily constructed are divided into stages, in which are located one, two, or more wheels. Between the stages are walls or diaphragms through which the shaft extends, and these are subjected to differences in pressure. At the point where the shaft passes through each of the walls or diaphragms a packing is provided to prevent or largely reduce the leakage from one wheel-compartment to another. These packings are only rendered accessible for the purpose of inspection or repair by taking down more or less of the machine, which is obviously an expensive undertaking. In other words, the packings are inaccessible and non-adjustable for all practical purposes.

The object of the present invention is to provide a packing for multistage turbines which within certain limits is self-adjusting to compensate for wear and which can be renewed from time to time as it wears away without taking down the turbine or interfering with its operation.

A further object is to provide a packing which is so constructed and arranged that the pressure thereon can be varied by means located at a convenient point external to the turbine-casing.

In carrying out the invention the wall or diaphragm between stages is provided with a packing-containing chamber of suitable formation which surrounds the shaft or the hub of the wheel carried by the shaft. The packing may be made of various materials. For example, I may use lead shot which are coated with graphite and rubber, the former imparting the necessary lubricating property and the latter the resiliency to make the packing self-adjusting within certain limits. The elastic or resilient feature of the packing also enables it to compensate for slight irregularities wherever they may exist. Another and suitable kind of packing is made of a mixture of asbestos and graphite. Owing to the limited space between the wheels and diaphragms, it is impracticable to adjust the packing in the ordinary way by a gland. In the present invention a chamber or passage is formed which extends at right angles or substantially at right angles to the axis of the shaft and is partially filled with a material of the same composition as the packing. This passage or chamber forms a reservoir for the reserve supply of packing material, which is fed forward as the shaft wears the packing away. Mounted in a manner to act on the packing in the reservoir is a ram or equivalent device. the effective action of which can be varied by means located at a convenient point—for example, at the side of the wheel-casing. The ram can advantageously be fed forward by a screw. Where the packing has little or no resiliency, a spring may be arranged to act on the ram or other pressure-maintaining device and the packing. A convenient arrangement is to place a spring between the ram and the packing, so that as the latter wears away it will be automatically fed forward. By properly arranging the parts with respect to each other the pressure on the packing around the shaft will be uniform and the leakage from one wheel-compartment to another prevented. The packing can be used with any type of turbine or equivalent construction.

In the accompanying drawings, which illustrate one embodiment of my invention, Figure 1 is a partial vertical section of a multistage turbine. Fig. 2 is a partial plan view of one of the diaphragms with certain parts broken away for clearer illustration. Fig. 3 is a detail sectional view of a modified form of the packing material. Fig. 4 is a slight modification of the means employed to feed the new packing material into the packing-containing chamber.

1 represents the casing of the turbine, which is divided into wheel-compartments by the diaphragm 2. In the present illustration only a single diaphragm or wall is shown; but it is to be understood that as many of these diaphragms or walls will be provided as are necessary to divide the machine into the proper number of stages. In the present illustration the diaphragm rests on an overhanging shoulder 3, formed on the casing; but the particular means for supporting the diaphragm is immaterial. Mounted in each compartment is a wheel 4. In the present instance each wheel is provided with two rows of buckets for fractionally abstracting the velocity of the fluid stream delivered by a suitable nozzle or equivalent device; but a greater or less number of rows can be used. Between the rows of wheel-buckets, where two or more are employed, is located a row of intermediate buckets 5, which may extend partially or wholly around the periphery of the wheel, as is desired. The wheels are mounted on the shaft 6, which in the present illustration occupies a vertical position; but the invention is applicable to horizontal machines as well. Each wheel is provided with a hub 7, which extends through an opening in the diaphragm. Formed in the diaphragm is a packing-receiving chamber 8, having inclined walls 9, which are so arranged that they tend to force the packing material against the hub of the wheel or the shaft, as the case may be. The chamber is closed at the upper and lower ends, measured in an axial direction, since the walls above and below the chamber are circular and are separated from the hub by a small clearance. Communicating with the chamber is a reservoir 10, that contains a supply of new packing material, which is fed forward into the chamber 8 by means of a suitable ram 11. In this figure the packing material is shown as being composed of lead shot each of which is provided with a coating composed of rubber and graphite. This packing has a certain amount of resiliency, which gives to it a limited capacity for self-adjustment—that is to say, after the ram 11 is moved to a fixed position and the machine started into operation the amount of material worn away by the rotation of the wheel will be compensated for by the elasticity or resiliency of the mass behind it. The passage which contains the ram is a continuation of the reservoir and extends through to the outside of the casing. Near the outer end the passage is provided with a screw-thread in which is located an adjusting-bolt 12. By rotating this bolt, which is preferably made separate from the stem of the ram, the pressure exerted on the packing can be varied to suit the conditions of operation.

Referring to Fig. 2, it will be noted that the reservoir 10 is connected with the chamber 8 by means of a gradually-enlarging passage 13, which is necessary in order to properly feed the new packing material forward and also to equalize the pressure exerted on all parts thereof. The pressure exerted by the ram is at right angles to the axis of the shaft, and while this is the best arrangement the angle can be changed somewhat without departing from the spirit of my invention.

Referring to Fig. 3, a slight modification is shown, wherein 6 is the shaft, 7 the hub of the wheel, and 2 the diaphragm. In this illustration a packing material is shown which is different from the one heretofore described. It is composed of a mixture of asbestos and graphite. The rams 11 are shown in the diaphragm, as in the previous figures, and as the packing material wears away or is forced through the clearance between the relatively moving parts new material is forced by them into the packing-containing chamber from the reservoir 10.

In Fig. 4 is shown a modified form of the ram. 11 represents a ram, and 12 represents the adjusting-bolt. Between the ram and the bolt is located a stiff compression-spring 14, which at all times exerts a pressure on the packing material and the reservoir 10. Under normal operating conditions this spring maintains the packing around the wheel-hub under the proper pressure. By adjusting the position of the bolt the tension of the spring, and therefore the pressure on the packing, will be varied. This form of ram may be used either with the packing shown in Figs. 1 and 2 or that shown in Fig. 3.

I do not wish to be understood as limiting myself to the particular kind of packing material described, since other compositions may be used under certain conditions.

I have shown my invention in connection with a turbine wherein the wheels rotate and the intermediate buckets are stationary; but it can also be used in connection with machines wherein the buckets rotate in opposite directions.

What I claim as new, and desire to secure by Letters Patent of the United States, is—

1. An elastic-fluid turbine comprising a wheel and shaft and inclosing casing, in combination with a chamber which surrounds the shaft and contains a packing, and means for feeding new packing material into the chamber as the old is worn away.

2. An elastic-fluid turbine comprising a wheel and shaft and inclosing casing, in combination with a chamber which surrounds the shaft and contains a packing, and an automatic means for feeding new packing material into the chamber as the old is worn away.

3. An elastic-fluid turbine comprising a wheel and shaft and a compartment therefor, in combination with a packing-containing chamber, a reservoir, and a means for feeding the packing from the reservoir into the chamber.

4. An elastic-fluid turbine comprising a wheel and shaft and inclosing casing, a chamber which surrounds the shaft and contains a packing, and a ram located in a plane at right angles to the plane of the shaft for feeding new packing material to the chamber and exerting a pressure thereon.

5. An elastic-fluid turbine comprising wheels and shafts located in separate compartments, in combination with a packing for preventing leakage from one compartment to another, comprising a body of yielding material, a ram located in the wall separating the compartments for feeding it toward the shaft, and a means external to the turbine-casing for controlling the action of the ram.

6. An elastic-fluid turbine comprising a wheel and shaft and inclosing casing, in combination with a chamber which surrounds the shaft, a resilient body of packing material in the chamber, and a means for feeding new packing material into the chamber as the old is worn away.

7. A packing for elastic-fluid turbines and the like, comprising two parts which are relatively movable and separated by a small clearance, a chamber formed in one of the parts, which surrounds the other and is closed at opposite points measured in an axial direction and contains a packing material, and means for feeding new material into the chamber through an opening in the side thereof.

8. A packing for elastic-fluid turbines and the like, comprising two parts which are relatively movable, a packing-containing chamber which is formed in one of the parts and incloses the other, a reservoir opening into the chamber, and means for forcing new packing material from the reservoir into the chamber.

9. A multistage turbine having walls which separate the wheel-compartments, in combination with a packing-containing chamber and reservoir formed in a wall, and a ram which occupies a chamber or passage in the wall for feeding new packing material into the chamber.

10. A multistage turbine having walls which separate the wheel-compartments, in combination with a packing-containing chamber having inclined walls, a reservoir which is connected to the chamber by a gradually-enlarging passage, and a means for feeding new packing material from the reservoir into the chamber.

11. An elastic-fluid turbine comprising a wheel-casing containing a chamber in one of its walls, a body of resilient packing in said chamber, and a ram which is urged in a manner to feed new material into the chamber.

12. An elastic-fluid turbine comprising a casing, a diaphragm for dividing the casing into compartments, and a shaft which extends through the diaphragm and carries the wheels, in combination with a chamber formed in the diaphragm which surrounds the shaft, a passage also formed in the diaphragm and opening into the chamber, and a means extending into the passage from the outside of the casing for feeding new packing material into the chamber and maintaining a pressure thereon.

13. In combination, a casing, a wall dividing the casing into compartments, a shaft passing through the wall, the shaft and wall being relatively movable, a packing which is contained in one of said parts and engages the other, and means for feeding new packing material forward as the old is worn away.

In witness whereof I have hereunto set my hand this 22d day of December, 1903.

OSCAR JUNGGREN.

Witnesses:
BENJAMIN B. HULL,
HELEN ORFORD.